(12) United States Patent
Petron (10) Patent No.: US 8,801,569 B2
(45) Date of Patent: Aug. 12, 2014

(54) METHODS AND APPARATUS FOR FLEXURE-BASED TORQUE SENSOR IN A BICYCLE

(71) Applicant: Arthur Petron, Somerville, MA (US)

(72) Inventor: Arthur Petron, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 13/715,064

(22) Filed: Dec. 14, 2012

(65) Prior Publication Data

US 2013/0157804 A1 Jun. 20, 2013

Related U.S. Application Data

(60) Provisional application No. 61/570,764, filed on Dec. 14, 2011.

(51) Int. Cl.
*H02P 17/00* (2006.01)
*B62M 6/50* (2010.01)
*B60W 20/00* (2006.01)

(52) U.S. Cl.
CPC *B60W 20/10* (2013.01); *B62M 6/50* (2013.01)
USPC .......................................................... 477/16

(58) Field of Classification Search
USPC .................................................. 477/3, 7, 16
See application file for complete search history.

(56) References Cited

U.S. PATENT DOCUMENTS

| | | | |
|---|---|---|---|
| 4,592,241 A * | 6/1986 | Obayashi et al. | 73/862.328 |
| 4,724,710 A | 2/1988 | Murty | |
| 5,324,238 A * | 6/1994 | Karp | 474/152 |
| 5,485,757 A | 1/1996 | Foxwell | |
| 5,533,410 A | 7/1996 | Smith | |
| 5,560,266 A * | 10/1996 | Shikimori et al. | 74/594.1 |
| 5,841,132 A | 11/1998 | Horton et al. | |
| 6,015,021 A * | 1/2000 | Tanaka et al. | 180/206.2 |
| 6,146,044 A | 11/2000 | Calvet | |
| 6,418,797 B1 * | 7/2002 | Ambrosina et al. | 73/862.29 |

(Continued)

OTHER PUBLICATIONS

Petron, A., A Bicycle Electric Assist Unit, Master's Thesis, Massachusetts Institute of Technology, cataloged Mar. 29, 2011.

(Continued)

*Primary Examiner* — Justin Holmes
(74) *Attorney, Agent, or Firm* — Stephen R. Otis (57) ABSTRACT

In exemplary implementations, a bicycle has "power pedaling", in which a rider's pedaling efforts are augmented by an electric motor. The rider can control the motor simply by pedaling. It is desirable that the motor torque not exceed the rider torque; otherwise the motor overpowers the rider. A radial flexure is part of the drivetrain that transmits torque from the rider to the back wheel. One part of the flexure is connected to the back wheel casing; another part of the flexure is connected to the freewheel. If motor velocity exceeds rider velocity, this causes the flexure to elastically deform. Two sensors measure the deformation, which is equal to the difference between the angular displacements of the casing and freewheel, respectively. A PD controller seeks to make this difference equal to zero, by controlling voltage levels in the motor (and thus controlling the torque contributed by the motor).

20 Claims, 8 Drawing Sheets

(56) References Cited

U.S. PATENT DOCUMENTS

| | | | |
|---|---|---|---|
| 6,672,418 B1 * | 1/2004 | Makino | 180/206.3 |
| 8,607,647 B1 * | 12/2013 | Wilson et al. | 73/862.31 |
| 2004/0255699 A1 | 12/2004 | Matzoll et al. | |
| 2008/0060451 A1 | 3/2008 | Puzio | |
| 2010/0280766 A1 * | 11/2010 | Roessingh et al. | 702/41 |
| 2011/0120232 A1 * | 5/2011 | Lassanske | 73/862.29 |
| 2012/0034027 A1 | 2/2012 | Valois | |
| 2012/0304783 A1 * | 12/2012 | Kitamura et al. | 73/862.49 |

OTHER PUBLICATIONS

Russell, J., Torque Sensor, EP patent application publication EP0216040 A2, published Apr. 1, 1987.

Pratt, J., Krupp, B., Morse, C., Series elastic actuators for high fidelity force control, (2002), Industrial Robot: An International Journal, vol. 29, No. 3, pp. 234-241.

Pratt, G., Williamson, M., Series elastic actuators (1995), Proceedings of the IEEE International Conference on Intelligent Robots and Systems, vol. 1, pp. 399-406.

* cited by examiner

THE PD CONTROLLER PROCESSES THE SENSOR MEASUREMENTS (WHICH ARE INDICATIVE OF THE DEFORMATION) AND OUTPUTS CONTROL SIGNALS. THE SIGNALS CONTROL VOLTAGE AND CURRENT LEVELS IN THE ELECTRIC MOTOR, AND THUS THE TORQUE CONTRIBUTED BY THE MOTOR TO THE BACK WHEEL. — 801

FIG. 8

AN ELECTRIC MOTOR DIRECTLY DRIVES THE WHEEL CASING (WHICH IS ATTACHED TO THE WHEEL). — 900

FIG. 9

BOTH THE PEDALS AND ELECTRIC MOTOR ARE COUPLED TO THE BIKE'S BACK WHEEL. — 1001

FIG. 10

METHODS AND APPARATUS FOR FLEXURE-BASED TORQUE SENSOR IN A BICYCLE

RELATED APPLICATIONS

This application is a non-provisional of, and claims the benefit of the filing date of, U.S. Provisional Application Ser. No. 61/570,764, filed Dec. 14, 2011, the entire disclosure of which is herein incorporated by reference.

FIELD OF THE TECHNOLOGY

The present invention relates generally to bicycles.

SUMMARY

In exemplary implementations, this invention helps facilitate motor-assisted pedaling of a bicycle. In this "power pedaling", an electric motor augments the power provided by a human rider's pedaling. It can feel to the rider as if the rider is pedaling in low gear, but the bike is moving rapidly as if in high gear. The rider can—simply by pedaling—control the power delivered by the bike's motor.

In a prototype of this invention, a radial flexure is part of a drivetrain that transmits torque from the rider to the back wheel. (The drivetrain includes the bike's pedals, a sprocket, a chain, another sprocket, a freewheel, the flexure and the back wheel's casing.)

In this prototype, the flexure is shaped like a thin disk, mounted so that it can rotate about the same axis of rotation as the back wheel. An inner portion of flexure disk (closer to the flexure's axis of rotation) is connected to the freewheel of the drive train. An outer portion of the flexure disk (further from the flexure's axis of rotation) is connected to the back wheel casing (and thus to the back wheel).

In this prototype, both the pedals and electric motor are coupled to the bike's back wheel 1001. Together, the pedals and electric motor provide a parallel drive for the bicycle.

In this prototype, it is desirable that the torque contributed by the motor to the wheel should not exceed the torque provided by the rider; otherwise, the motor may overpower the rider. The goal is for the motor to augment the rider's pedaling, not to overpower it. Overpowering the rider would result in the rider being unable to contribute energy to the rear wheel.

In this prototype, the flexure, two sensors and a proportional derivative (PD) controller are used (1) to detect if the motor torque exceeds the rider torque, and (2) to control the motor to seek to prevent this from happening. If motor torque exceeds rider torque, this causes the rotational displacements of the back wheel and freewheel to be different (each rotational displacement being relative to a shaft that is attached in a fixed position relative to the bike's frame). For example, the motor may cause the back wheel to rotate further than the freewheel. This difference causes the radial flexure to undergo elastic deformation (because the inner part of the flexure is coupled to the freewheel and the outer part of the flexure is coupled to the back wheel).

In this prototype, the two sensors measure the elastic deformation of the flexure, as follows: A reflective optical sensor (which is fixed relative to the bike frame) measures the angular displacement of the freewheel. A magnetic sensor (which is also fixed relative to the bike frame) measures the angular displacement of the wheel casing. From these two measurements, the angular displacement (deformation) of the flexure is computed: $\theta_{flexure} = \theta_{pedal} - \theta_{wheel}$, where the angular displacement of the freewheel is used as a proxy for $\theta_{pedal}$ and the angular displacement of the wheel casing is used as a proxy for $\theta_{wheel}$.

In this prototype, the PD controller seeks to cause $\theta_{flexure} = \theta_{pedal} - \theta_{wheel}$ to be equal to be equal to zero. (Alternately, the controller may seek to cause $\theta_{flexure} = \theta_{pedal} - \theta_{wheel}$ to be equal to a constant.) The PD controller processes the sensor measurements (which are indicative of the deformation) and outputs control signals. The signals control voltage and current levels in the electric motor, and thus the torque contributed by the motor to the back wheel 801.

In this prototype, the flexure comprises grade 5 titanium. The width of the flexure along its axis of rotation is about 5 mm; the radius of the flexure is about 40 mm. Thus, the flexure is roughly disk-shaped. The flexure has 40 "spokes" that connect an inner rim of the flexure with an outer rim of the flexure. The elastic deformation of the flexure occurs almost entirely in the flexure's spokes. The shape of each spoke resembles a lopsided bowtie: the spoke is narrower in its middle and wider at its ends. The shape is lop-sided because the outer end of each spoke is wider than the inner end of each spoke.

This prototype is only a non-limiting example of this invention. For example, the flexure in this invention can be implemented with different materials, different shapes, different dimensions, and a different number of "spokes". Or, for example, different sensors or controllers may be used.

In exemplary implementations, this invention comprises an apparatus that both (1) transmits rider torque from a human rider of the bicycle to a wheel of the bicycle; and (2) controls torque contributed to the wheel by the motor.

The description of the present invention that is set forth in this Summary section (and in the Abstract section) is just a summary. It is intended only to give a general introduction to some illustrative implementations of this invention. It does not describe all of the details of this invention. This invention may be implemented in other ways.

The above Figures illustrate some illustrative implementations of this invention, or provide information that relates to those implementations. However, this invention may be implemented in many other ways. The above Figures do not show all of the details of this invention.

DETAILED DESCRIPTION

Figure 1:
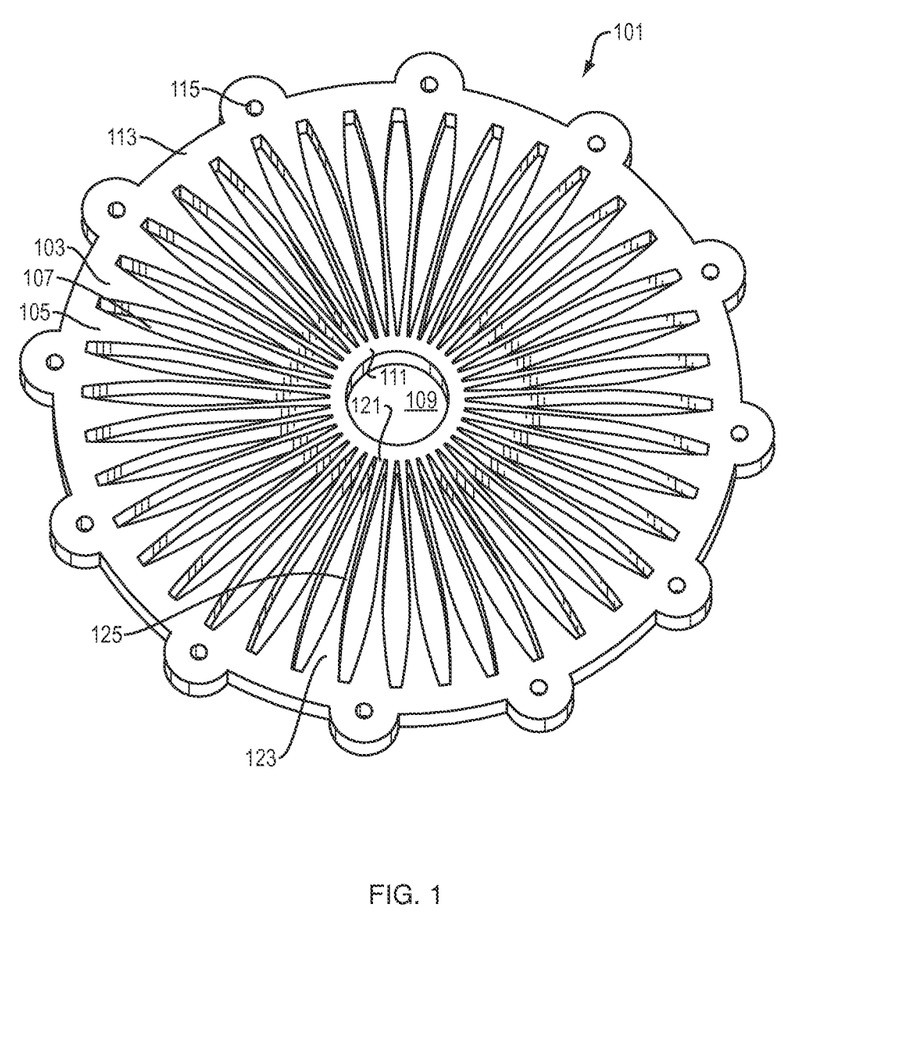
FIG. 1 shows a radial flexure.

FIG. 1 shows a radial flexure 101, in an illustrative implementation of this invention. The flexure 101 is disk-shaped, and configured to rotate about an axis of rotation at the center of the flexure. The flexure comprises an outer rim 113, an inner rim 111, and forty "spokes" (e.g., 103, 105) that radiate outward from the axis of rotation. The spokes (e.g., 103, 105) are separated by holes (e.g., 107). Each spoke is shaped roughly like a lop-sided bowtie: it is narrower in its middle (e.g., 125) than at its ends (e.g., 121, 123). Each spoke is lopsided because its outer end (e.g., 123) is wider than the inner end (121). In this context, "outer" means closer to the outer rim 113 and "inner" means closer to the inner rim 111. The spokes are configured to elastically deform when the angular displacement of the pedal is different than the angular displacement of the wheel (in each case measured relative to a reference that is fixed relative to the bike frame). That is, the spokes are configured to elastically deform when $\theta_{flexure}=\theta_{pedal}-\theta_{wheel}\neq 0$. In this elastic deformation, the length of the spoke does not change, but the outer end of the spoke tends to rotate about the axis of rotation, relative to the inner end of the spoke. The flexure 101 has a hole 109 at the center of the flexure. Part of the freewheel apparatus is inserted into this hole 109.

Figure 2:
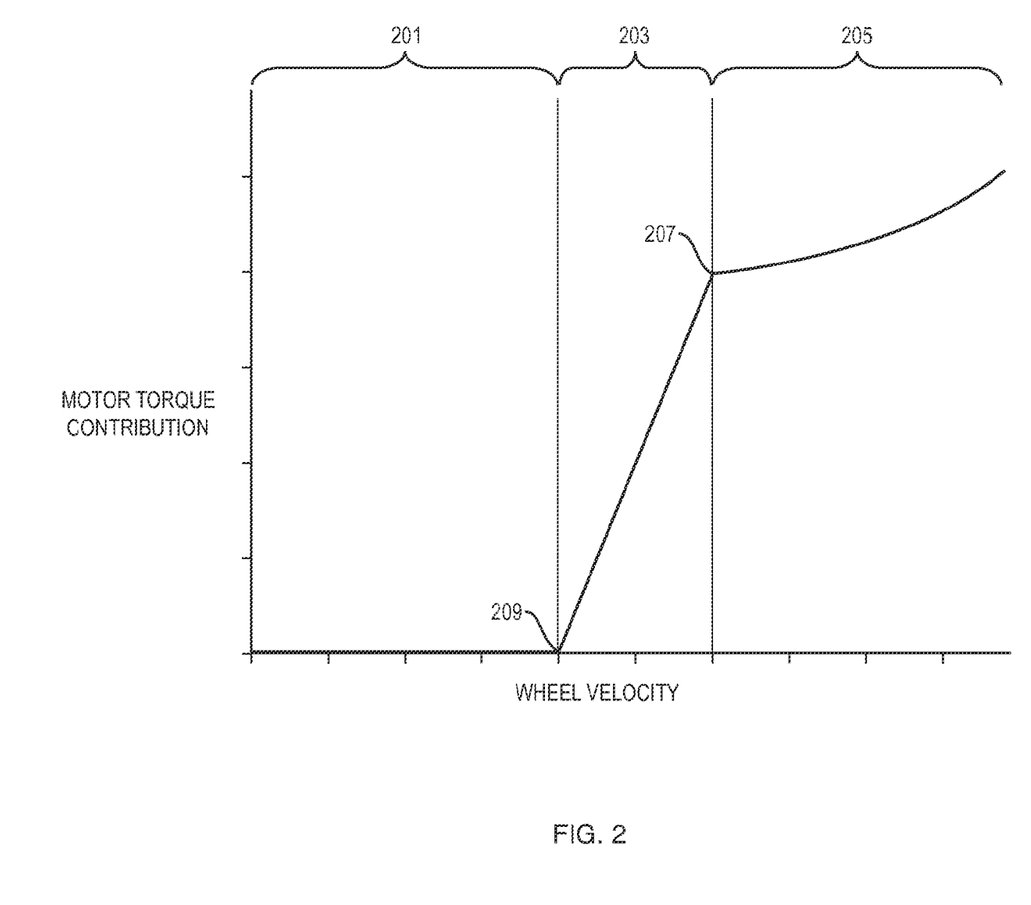
FIG. 2 is a graph that shows motor torque contribution versus wheel velocity.

FIG. 2 is a graph that shows motor torque contribution versus wheel velocity, in an illustrative implementation of this invention. FIG. 2 shows the torque contribution of the motor with reference to the wheel velocity given a fixed velocity input provided by the user. This is not the total torque output of the motor, merely the effective torque output to the ground after factoring in the torque provided by the user to maintain the wheel at the fixed velocity input. Also, the graph represents the instantaneous state where the motor meets a specified torque requirement. After this point in time the wheel velocity will increase due to the motor's effective torque contribution being non-zero, which will move the fixed velocity to a new point.

If the motor's torque is not high enough to reach the wheel velocity of the rider, then the motor will effectively drag on the user, the curve is effectively flat in this region 201, but in reality is has some small non-zero slope. At the point 209 where the motor's torque is equal to the rider's input torque the motor begins to contribute to the system. This part 203 of the curve is very steep because a very small amount of torque increase from this point will lead to a point 207 where the motor outpaces the rider. In region 205 (in which the motor outpaces the rider), the rider's drivetrain freewheels, and effectively leading to the rider contributing zero torque to the system. The flexure helps to control this situation by providing a direct sensor link between position on this steep slope and motor torque.

In FIG. 2: The rider is outpacing the motor in region 201. The rider and motor have matched velocities in region 203. The motor is outpacing the rider in region 205. From the motor's perspective, the torque construction preferably matches the rider's velocity while providing torque in a range 203 that neither drags on the user nor overpowers the user.

Figure 3:
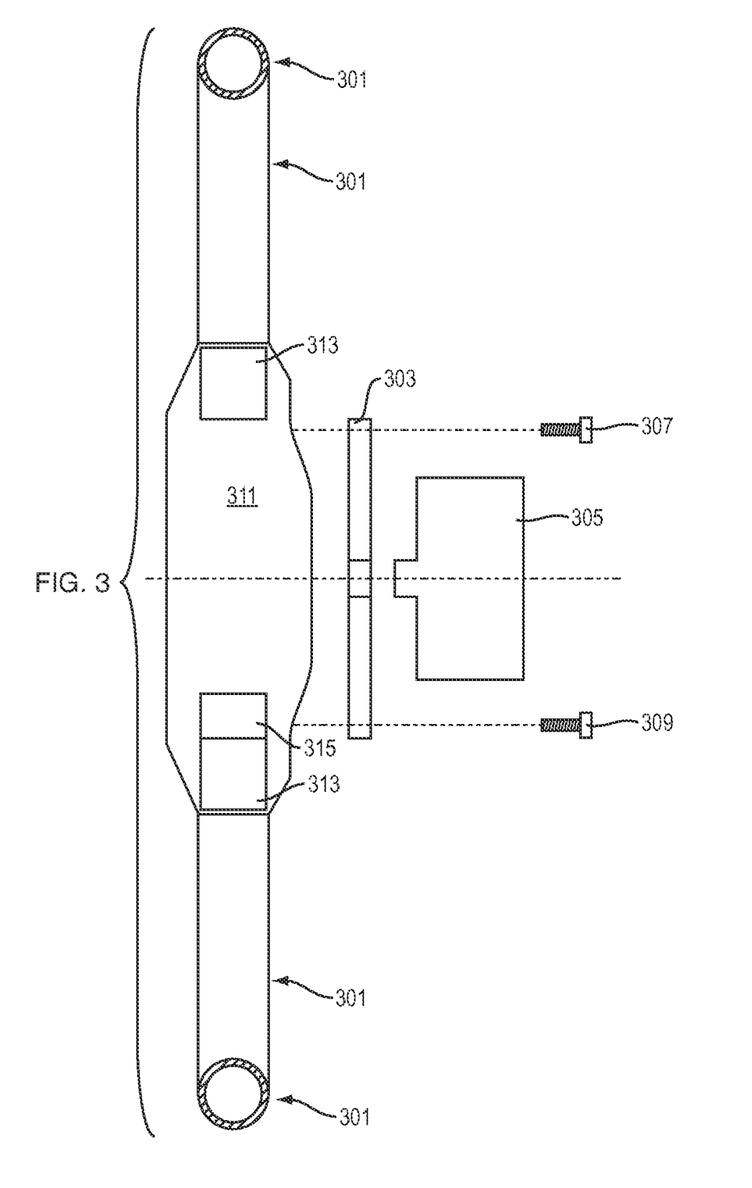
FIG. 3 is a diagram showing the flexure, freewheel, back wheel and motor.

Unfortunately, zone 203 has a very steep slope. The elasticity in the flexure helps to lessen the slope, thus making the control task easier FIG. 3 is a diagram showing how the flexure is coupled to the freewheel and back wheel casing, in an illustrative implementation of this invention. The freewheel 305 drives the flexure 303 from the center. The outside of the flexure 303 drives the wheel casing 311, which is attached to the back wheel 301. Screws (e.g., 307, 309) penetrate the outer rim of the flexure 303 and attach the outer rim of the flexure to the wheel casing 311. The inner rim of the flexure 303 is coupled to the freewheel 305. An electric motor 313 directly drives the wheel casing 311 (which is attaached to the wheel 301) 900. The controller 315 may be located adjacent to the motor 313.

Alternately, the rider drivetrain may not include a freewheel 305. For example, the bike may have a single, fixed gear. In that case, the inner rim of the flexure 303 may connect to another body that transmits torque from the rider to the flexure. For example, in a fixed gear bike, the flexure may connect directly to the back wheel chain sprocket (or directly to a body that transmits torque from the back wheel chain sprocket to the flexure).

In a prototype of this invention, the controller 315 is a PD controller. Alternately, a different type of controller may be used. For example, the controller 315 may be a proportional-integral-derivative (PID) controller.

Figure 4:
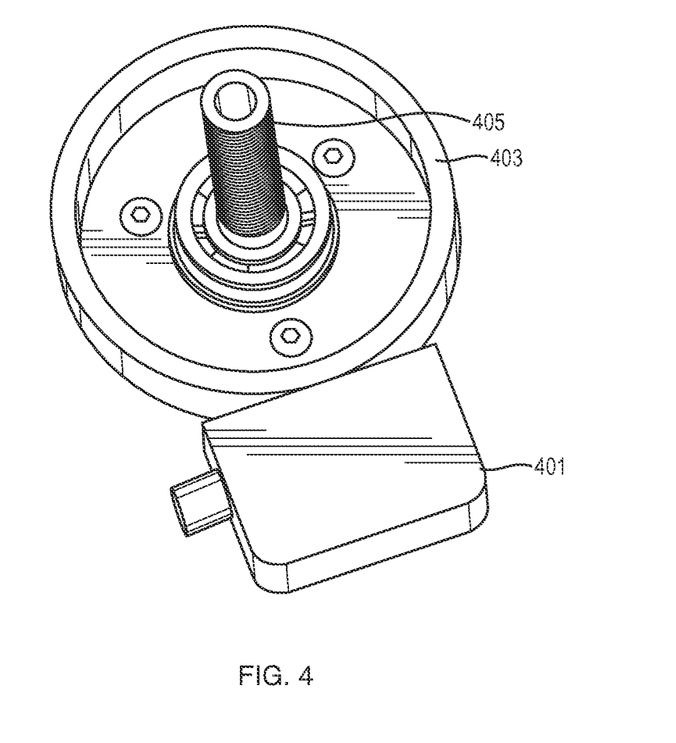
FIG. 4 shows a magnetic encoder sensor, for measuring angular displacement of the back wheel casing (and thus of the back wheel).

FIG. 4 shows a magnetic encoder sensor 401, in an illustrative implementation of this invention. The magnetic sensor 401 measures angular displacement of the wheel casing (and thus of the back wheel). In FIG. 4, a shaft 405 is fixed relative to the bike frame. The magnetic sensor 401 is attached to a disk which is fixed rigidly to the shaft. Thus, the sensor 401 does not rotate relative to the shaft. In contrast, encoder ring 403 is attached to the wheel casing. The encoder ring 403, wheel casing and wheel all rotate about the shaft 405.

Figure 5:
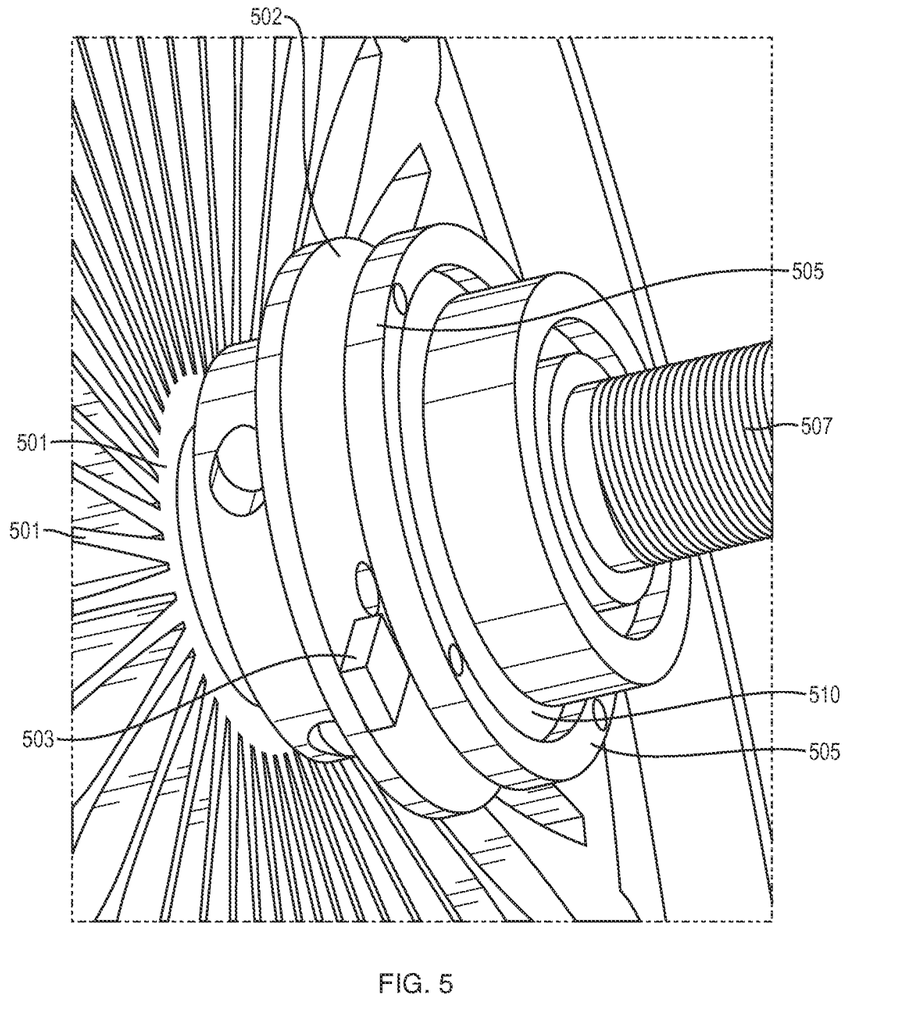
FIG. 5 shows an optical reflective sensor, for measuring angular displacement of the freewheel (and thus of the pedal).

FIG. 5 shows an optical reflective sensor 503, in an illustrative implementation of this invention. The optical sensor 503 measures angular displacement of the freewheel (and thus indirectly of the pedal, when the pedals are not freewheeling). In FIG. 5, a shaft 507 is fixed relative to the bike frame. The optical sensor 503 is attached to a sensor disk 502, which is in turn fixed rigidly to the shaft 507. Thus, the optical sensor 503 does not rotate relative to the shaft 507.

Reflective encoder ring 505 and encoder disk 510 comprise a single, monolithic structure, which is attached to the freewheel. The reflective encoder ring 505, encoder disk 510 and freewheel all rotate about shaft 507.

Figure 6:
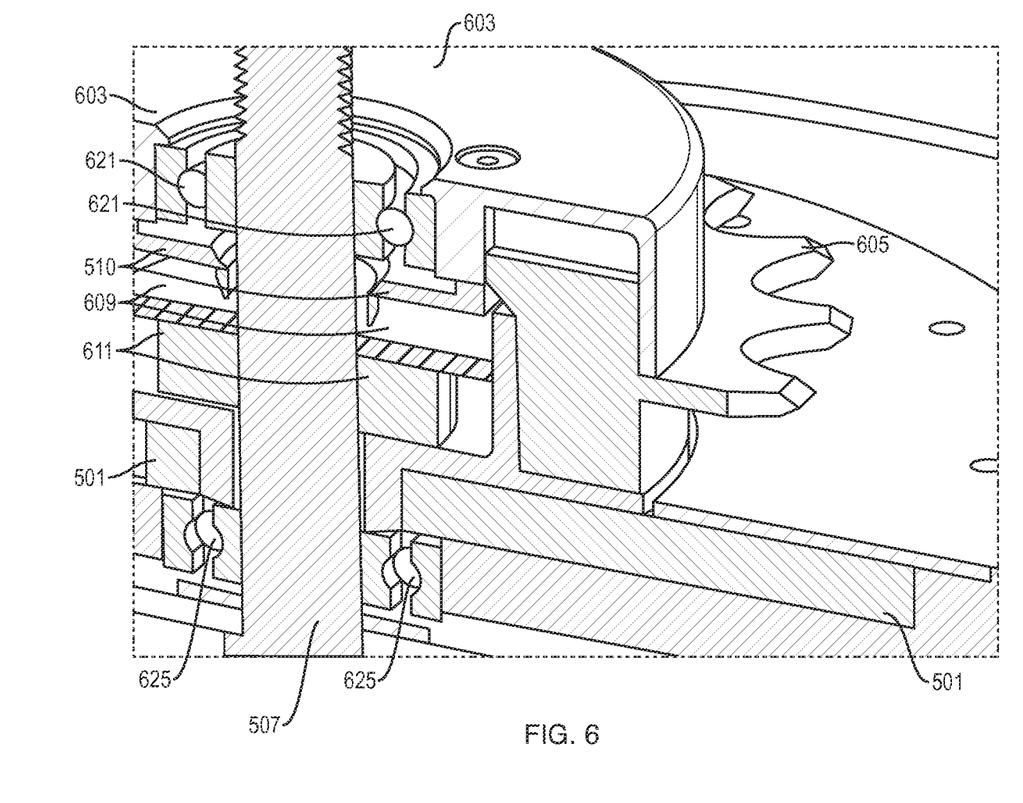
FIG. 6 is a cross-sectional view of the flexure and other nearby parts.

FIG. 6 is a cross-sectional view of the flexure 501 and other nearby parts, in an illustrative implementation of this invention. The freewheel 603 is attached to (i) chain sprocket 605, (ii) reflective encoder disk 510, and (iii) an inner portion of the radial flexure 501. The freewheel 603, sprocket 605, reflective encoder disk 510 and flexure 501 all rotate about shaft 507. Bearing 621 facilitates rotation of the freewheel 603. Bearing 625 facilitates rotation of the flexure 501. Encoder circuit board 609 and circuit board mount 611 are fixed relative to the shaft 507, and do not rotate.

Figure 7:
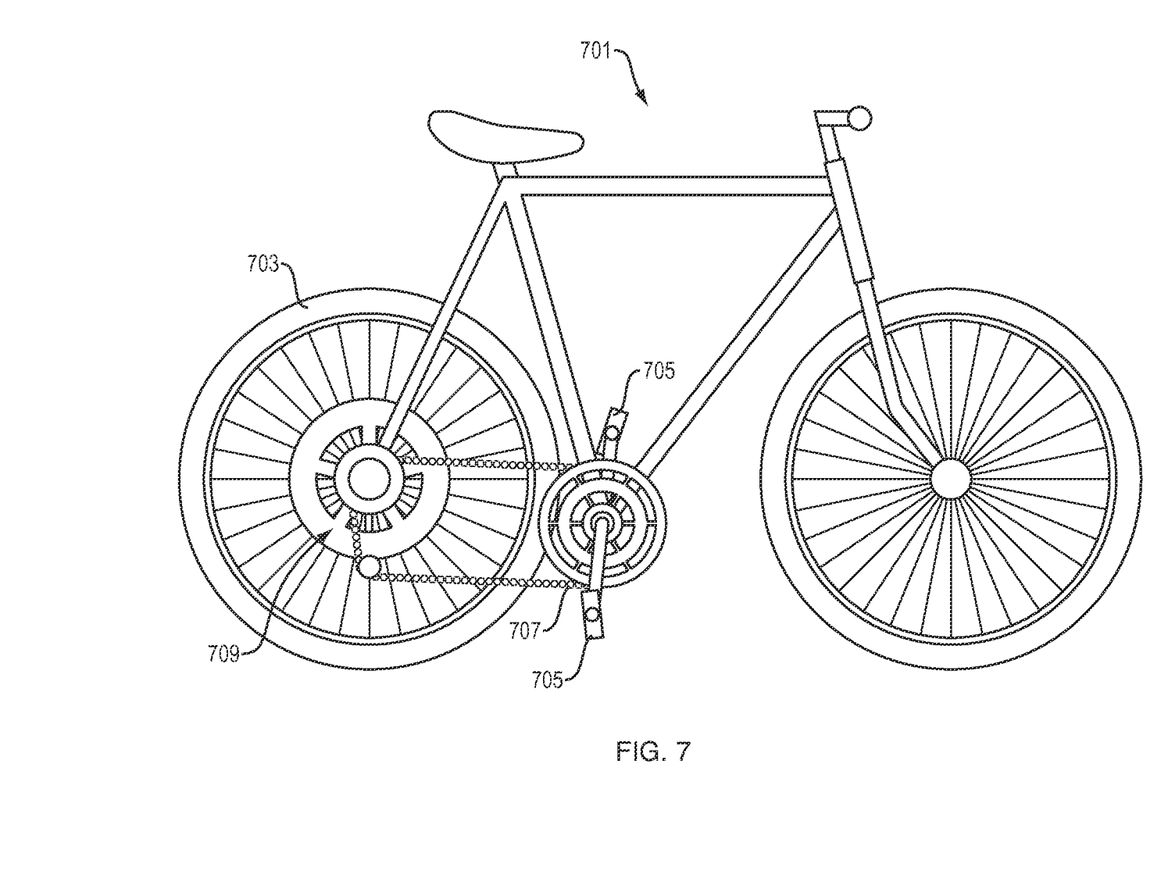
FIG. 7 shows a bicycle, in which the flexure is used.
Figure 8:
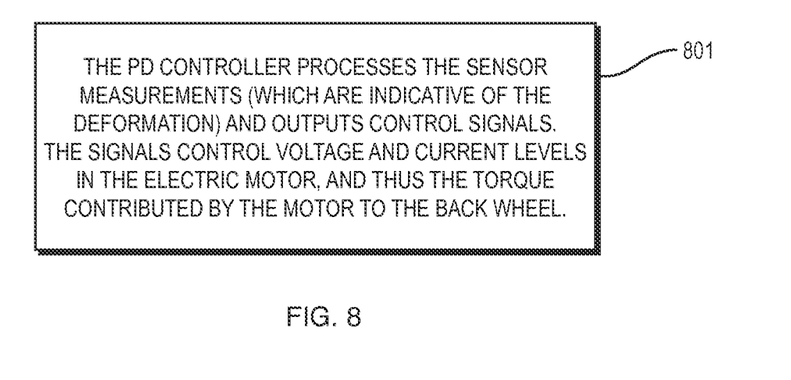
FIG. 8 provides information about, among other things, a controller.
Figure 9:
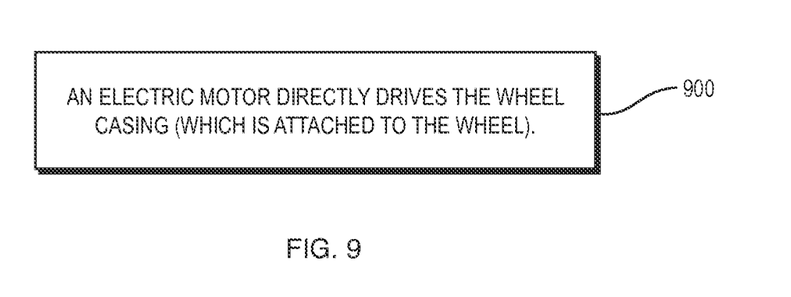
FIG. 9 provides information about, among other things, an electric motor.
Figure 10:
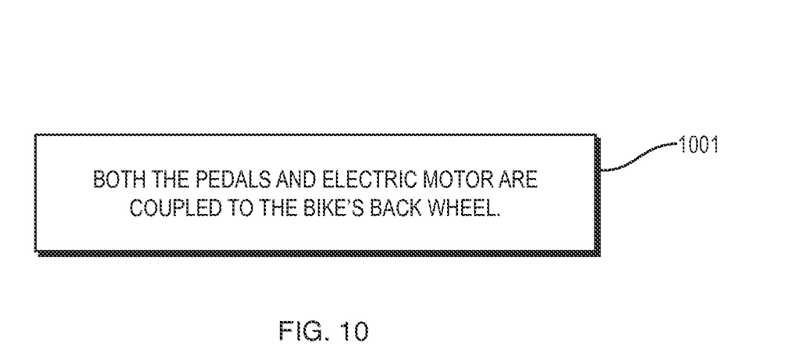
FIG. 10 provides information about, among other things, an electric motor.

FIG. 7 shows a bicycle 701, in an illustrative implementation of this invention. Torque from the rider is transmitted to the back wheel 703 through a drivetrain that includes pedals 705, a chain 707, sprockets, the freewheel and the flexure. The wheel casing 709 for the back wheel 703 is mounted near the center of that wheel.

In exemplary implementations of this invention, a radial flexure is part of a torque sensor that provides a specific, known displacement at a given force. The flexure-based torque sensor accurately measures input torque to a spinning system. The torque sensor is self-contained within an electric bicycle. (In contrast, it would be difficult to use RF because of interference with the motor RF emissions; also, slip rings are inherently noisy and large).

Flexure-based torque measurement has at least eight advantages:

First, it can provide a clean torque estimate over an entire range of normal torque input from a human rider.

Second, it can provide a spring constant between the freewheel and the wheel, which acts to decrease the slope of the line on which the motor torque output needs to reside.

Third, measurements by the flexure-based torque sensor can be used by a controller to help to control a system that includes not just the sensor, but also the rotational inertia of its casing, the input torque of the rider, the unknown rotational inertia of the wheel, and the linear inertia of the bicycle and its rider.

Fourth, flexures do not typically "wear our " easily. Because the concepts of fatigue and yielding are well understood, a flexure can be designed to provide an exact level of performance throughout its life. Moreover, flexures typically do not have sliding parts, bearings, or fluids.

Fifth, flexures have advantageous manufacturing qualities. Generally a flexure can be produced inexpensively and easily. Assembly can be either non-existent or very simple, especially given that many flexures are made from a single piece of material.

Sixth, in a controlled system flexures can offer extremely accurate and smooth displacements. Even complex flexure mechanisms can have displacements that are linear and predictable down to atomic resolutions. Manufacturing tolerance errors generally result in a flexure following a non-ideal path, but typically a flexure will do so linearly while maintaining a linear relationship between applied force and displacement.

Seventh, because flexures can be made from a single piece of material, stress concentrations due to manufacturing processes such as welding, clamping, and gluing can be avoided, preventing unwanted residual stresses that can lead to non-linearities, manufacturing defects, and untimely failure.

Eighth, flexures can provide controlled, predictable leveraging and can be insensitive to changes in environment, such as temperature.

In a prototype of this invention, during periods when the electric motor helps power the bicycle, the motor is controlled with a second-order proportional-differential position controller. The position in question is the displacement $\theta_{flexure}$, which translates directly to the error of $\theta_{pedal} - \theta_{wheel}$. The control system seeks to make $\theta_{pedal} - \theta_{wheel}$ zero at all times—and thus to make the motor torque equal to the rider's input torque.

In this prototype, there are other periods when the motor does not help power the bicycle. For example, when $\theta_{pedal} < \theta_{wheel}$ but $\theta_{pedal} > 0$ (both $\theta_{pedal}$ and $\theta_{wheel}$ are referenced from the bicycle shaft, which is rigidly attached to the bicycle frame) the electric bicycle is in "coast" mode. In this mode the motor may be electrically off, allowing the bicycle to coast as a normal bicycle would. During times when $\theta_{pedal} < 0$, (the rider is pedaling backwards) the bicycle may enter regenerative braking mode, slowing the bicycle down proportionally to the speed at which the rider is pedaling backwards. This regenerative braking technique allows the normal physical brakes to function nominally.

An exemplary use of this torque measurement system is for electric bicycles. The integration of the torque sensor with the motor hub means that the user does not need to use a handlebar mounted throttle to control the motor. Instead, the torque sensor allows the electric bicycle system to determine the most appropriate torque to provide to the user during use.

In exemplary implementations, this invention measures the rider's torque input to the bicycle and outputs control signals to provide a ratiometric assist torque from the motor. The rider and motor act in parallel to the wheel. This means that both the rider and motor have a direct coupling to the wheel. However, the rider's coupling is unidirectional due to the presence of a freewheel sprocket on the hub's chain drive.

In exemplary embodiments of this invention, it is desirable that motor assist torque not be higher than the torque that the rider supplies to the wheel at any given time, in order to avoid freewheeling the bicycle and consequently driving the bicycle with no power input from the rider. (Riding under only motor power causes a lack of control and interferes with the "feel for the road" that is offered by bicycle riding. In general, motoring without pedaling turns a bicycle into an electric scooter.)

In exemplary implementations of this invention, although the motor torque cannot be higher than the rider input torque, this still accounts for an effective doubling of the rider's input power at the road. This tight control of input versus output allows the rider to feel a direct connection with the road and bicycle—almost as if the electric assist were not present. A bicycle with this "power pedaling" may feel like a bicycle in low gear that goes the speed of a bicycle in high gear. Thus, in exemplary implementations, this invention gives the ability to ride faster, or at the same speed with less effort while maintaining a feel similar to an unmodified cycling experience.

In a prototype of this invention, the flexure is located in the freewheel side of the wheel hub (the right side from the point of view of a rider seated on the bicycle). In this prototype, it is desirable that: (a) the thickness of the flexure in the axial direction be no more than 5 mm (given space requirements of the hub); (b) the radius of the flexure be no more than 40 mm (in order to maintain aesthetic symmetry between the left and right sides of the wheel hub); (c) an incremental reflective optical encoder provide a quadrature resolution of 8 counts per degree; (d) at least 30 counts be taken (in order to have enough data to generate a smooth control curve); and (e) the flexure be designed with a deflection goal of 5 degrees (note that five degrees of deflection gives 40 counts).

In this prototype, it is also desirable that: (a) the flexure include space for the central shaft plus clearance as well as space for a central mounting coupling between the flexure and the freewheel; and (b) the central hole in the flexure be roughly 16 mm (a 16 mm×1 threaded hole), in order to handle the coupling's torque requirements.

It can be helpful to use a simplified model when designing the radial flexure. According to principles of this invention, in this model: (a) each spoke is modeled as a beam with a constant rectangular cross-section over its length, and (b) deflection of the beam is assumed to be Cartesian. In reality each spoke in the flexure deflects radially. However, a deflection of five degrees allows Cartesian deflection to be assumed without sacrificing accuracy. This assumption also allows the model to treat deflection of a spoke in the flexure as a simple beam deflection problem.

Using this this model, a uniform thickness t of the spoke (in a direction orthogonal to both the longitudinal axis of the spoke and the axis of rotation) can be estimated as:

$$t = \frac{\sigma l^2}{3E\delta} \quad \text{(Equation 1)}$$

where l is the length of the spoke along the spoke's longitudinal axis, E is the Young's Modulus for the spoke, σ is maximum normal stress at any point on the spoke, and δ is deflection of the outer tip of the spoke Also, using this model, the minimum number n of spokes that are needed to handle a given torque τ can be estimated as:

$$n = \frac{\tau 3l}{r\sigma w t^2} \quad \text{(Equation 2)}$$

where r is the distance from the base of the spoke to the axis of rotation of the flexure, w is the width of the spoke along the axis of rotation, and torque τ is equal to the torque of the freewheel minus the torque of the wheel. The ability to calculate approximate spoke thicknesses and numbers for an arbitrary radial flexure, before entering the physical design stage, can save a designer weeks of design time, as compared to a purely trial and error approach.

Definitions and Clarifications:

Here are a few definitions and clarifications. As used herein:

The terms "a" and "an", when modifying a noun, do not imply that only one of the noun exists.

The term "connected" (and grammatical variations thereof) includes both directly connected and indirectly connected. Similar terms (for example, "couple", "join" and grammatical variations thereof) shall be construed in like manner.

The term "comprise" (and grammatical variations thereof) shall be construed broadly, as if followed by "without limitation". If A comprises B, then A includes B and may include other things.

The term "e.g." means including without limitation.

The fact that an "example" or multiple examples of something are given does not imply that they are the only instances of that thing. An example (or a group of examples) is merely a non-exhaustive and non-limiting illustration.

"Flexure" means a device configured for repeated elastic deformation. A flexure may be monolithic or may comprise separate parts that are attached together.

The term "flexural" is an adjective meaning of or relating to a flexure.

The term "include" (and grammatical variations thereof) shall be construed broadly, as if followed by "without limitation".

The term "or" is an inclusive disjunctive. For example "A or B" is true if A is true, or B is true, or both A or B are true.

A parenthesis is simply to make text easier to read, by indicating a grouping of words. A parenthesis does not mean that the parenthetical material is optional or can be ignored.

A "radial flexure" means a flexure that is configured to rotate about an axis of rotation, and that includes elastic members, which elastic members are radial relative to the axis of rotation.

The terms "radiate", "radial", "radiate from" and similar terms (and grammatical variations thereof) shall be construed broadly. For example, a spoke may "radiate from" an axis of rotation, even though the spoke does not start at the axis of rotation, but instead begins at a non-zero radial distance from the axis and ends at another radial distance even further from the axis. Also, for example, a spoke may "radiate from" an axis of rotation, even though the longitudinal axis of the spoke: (1) is not a straight line, (2) is not orthogonal to the axis of rotation, and (3) is not oriented along a line that passes through the axis of rotation.

A "RTFC" (or "Rider-To-Flexure Component") is a part that is configured to be directly coupled to the radial flexure and to be part of a drivetrain that transmits torque from a human rider to the radial flexure. For example, depending on the particular implementation, any of the following may be configured as an RTFC: (1) a freewheel, (2) in a fixed gear bike, the back wheel chain sprocket (if it is directly coupled to the radial flexure) or (3) in a fixed gear bike, another part that is directly coupled to the radial flexure and that transmits rider torque from the back wheel chain sprocket to the radial flexure. In an illustrative embodiment of this invention, item 305 in FIG. 3 may be a freewheel or may instead be another type of RTFC. RTFC 305 may be of any shape and size.

The term "spoke" shall be construed broadly. For example, any elongated body (or elongated part) oriented along a line that radiates from an axis of rotation is a spoke. Or, for example, a spoke may be of any thickness, and its thickness may vary over its length. Or, for example, a spoke may be elongated along a longitudinal axis and may be either (i) symmetric about that axis or (ii) asymmetric about that axis. Or, for example, a spoke may have an overall shape like a bowtie, being thicker at the ends and thinner in the middle, and one end of the spoke (e.g., farthest from an axis of rotation) may be thicker than the other end of the spoke (e.g., closest to the axis of rotation). A spoke may be included, along with other bodies, in a monolithic structure. Or a spoke may be a separate part. A spoke may comprise any one or more materials. The angle of all or part of a spoke relative to an axis of rotation may vary; this angle need not be orthogonal.

Unless the context clearly requires otherwise, a reference to a vector includes the magnitude of the vector.

Variations:

This invention may be implemented in many different ways. Here are some non-limiting examples.

This invention may be implemented as apparatus for transmitting rider torque from a human rider of a bicycle to a wheel of the bicycle and for controlling torque contributed to the wheel by a motor; which apparatus comprises: (a) a radial flexure; (b) one or more sensors; and (c) a controller; wherein (i) the flexure is configured to be part of a drivetrain comprising pedals, an RTFC and the flexure, which drivetrain is configured to transmit the rider torque from the rider through at least the pedals, the RTFC and flexure to the wheel; (ii) the flexure is configured to undergo elastic deformation due to a difference between rotational displacement of the wheel and of the RTFC, respectively; (iii) the one or more sensors are configured to measure the elastic deformation; and (iv) the controller is configured to control the motor to seek to cause the difference between rotational displacement to be a constant. Furthermore: (1) the motor may be an electric motor; (2) the apparatus may further comprise one or more parts of the bicycle, in addition to the flexure, the one or more sensors and the controller; (3) the RTFC may be a freewheel; (4) the constant may be zero; (5) the flexure may be configured to have an axis of rotation, the flexure may have an axial length along the axis of rotation and a radial length along a radius that is normal to the axis of rotation; and the radial length may have a minimum, which minimum is equal to or greater than four times the axial length; (6) the flexure may be configured to have an axis of rotation; and the flexure may include spokes that radiate from the axis of rotation; (7) each of the spokes, respectively, may be elongated along a longitudinal axis, may have a first end, a second end, and a central region between the first and second ends, and may be narrower in the central region than at the first and second ends; (8) the flexure may be configured to have an axis of rotation, the flexure may have an inner perimeter closest to the axis of rotation and an outer perimeter furthest from the axis of rotation, and the elastic deformation may include the outer perimeter rotating about the axis of rotation through a different number of degrees than the inner perimeter rotates about the axis of rotation; (9) the flexure may be a monolithic structure and the spokes may be included in the monolithic structure; (10) at least one of the one or more sensors may be an optical sensor; (11) at least one of the one or more sensors may be a magnetic encoder; (12) the one or more sensors may comprise a first sensor and a second sensor, the first sensor may be configured to measure angular displacement of the wheel or of a part operatively coupled to the wheel, relative to a reference, and the second sensor may be configured to measure angular displacement of the RTFC, relative to the reference; (13) the controller may be a proportional-derivative controller; and (14) the flexure may be configured to elastically deform during at least a time period in which: (i) the torque contributed to the wheel by the motor exceeds the rider torque; (ii) the elastic deformation of the flexure is changing in magnitude; and (iii) rotational speeds of the wheel and RTFC are equal to each other.

This invention may be implemented as apparatus comprising a radial flexure, one or more sensors and a controller, wherein: (a) the radial flexure is configured to be part of a drivetrain in a bicycle, which drivetrain includes pedals, an RTFC and the flexure, and which drivetrain is configured to transmit torque from a human rider of the bicycle through at least the pedals, RTFC and radial flexure to a wheel of the bicycle; (b) the bike has a frame; a part of the bicycle has a fixed position relative to the frame; the wheel has a first rotational angle relative to the part; and the RTFC has a second rotational angle relative to the part; (c) the first and second rotational angles may each vary as the wheel and the RTFC, respectively, rotate; (d) the radial flexure is configured to undergo elastic deformation due to a difference between the first and second rotational angles; (e) the one or more sensors are configured to measure the elastic deformation; and (f) the controller is configured to seek to cause the elastic deformation to be equal to a constant, by controlling torque imparted on the wheel by a motor. Furthermore: (1) the apparatus may further comprise one or more parts of the bicycle, in addition to the flexure, the one or more sensors and the controller; and (2) the constant may be zero.

This invention may be implemented as a method comprising, in combination: (a) using a drivetrain in a bicycle, which drivetrain includes pedals, an RTFC and a radial flexure, to transmit torque from a human rider of the bicycle through at least the pedals, RTFC and flexure to a wheel of the bicycle; (b) using one or more sensors to measure elastic deformation of the flexure, which elastic deformation is due to a difference between rotational displacement of the wheel and of the RTFC, respectively; and (c) using a controller to seek to cause the difference to be equal to a constant, by controlling torque contributed to the wheel by a motor. Furthermore: (a) the flexure may be configured to have an axis of rotation; and the flexure may include spokes that radiate from the axis of rotation.

Conclusion:

It is to be understood that the methods and apparatus that are described above and below are merely illustrative applications of the principles of the invention. Numerous modifications may be made by those skilled in the art without departing from the scope of the invention.

What is claimed is:

1. Apparatus comprising, in combination:
   (a) a radial flexure;
   (b) one or more sensors; and
   (c) a controller;
   wherein
   (i) the flexure is part of a drivetrain, which drivetrain comprises the radial flexure, pedals of a bicycle, and a component that is directly coupled to the flexure, and which drivetrain is configured to transmit power from the pedals to a wheel of the bicycle;
   (ii) the flexure is configured to undergo elastic deformation due to a difference between rotational displacement of the wheel and of the component, respectively;
   (iii) the one or more sensors are configured to measure the elastic deformation; and
   (iv) the controller is configured to seek to cause the difference between rotational displacement to be a constant, by controlling torque imparted by a motor to the wheel.

2. The apparatus of claim 1, wherein the motor is an electric motor.

3. The apparatus of claim 1, wherein the apparatus further comprises one or more parts of the bicycle, in addition to the flexure, the one or more sensors and the controller.

4. The apparatus of claim 1, wherein the component is a freewheel.

5. The apparatus of claim 1, wherein the constant is zero.

6. The apparatus of claim 1, wherein:
   (a) the flexure is configured to have an axis of rotation;
   (b) the flexure has an axial length along the axis of rotation and a radial length along a radius that is normal to the axis of rotation; and
   (c) the radial length has a minimum, which minimum is equal to or greater than four times the axial length.

7. The apparatus of claim 1, wherein:
   (a) the flexure is configured to have an axis of rotation; and
   (b) the flexure includes spokes that radiate from the axis of rotation.

8. The apparatus of claim 7, wherein each of the spokes, respectively:
   (a) is elongated along a longitudinal axis; and
   (b) has a width, normal to the longitudinal axis, that varies along a majority of the length of the longitudinal axis.

9. The apparatus of claim 7, wherein:
   (a) the flexure is configured to have an axis of rotation; and
   (b) the flexure has an inner perimeter closest to the axis of rotation and an outer perimeter furthest from the axis of rotation; and
   (c) the elastic deformation includes the outer perimeter rotating about the axis of rotation through a different number of degrees than the inner perimeter rotates about the axis of rotation.

10. The apparatus of claim 7, wherein the flexure is a monolithic structure and the spokes are included in the monolithic structure.

11. The apparatus of claim 1, wherein at least one of the one or more sensors is an optical sensor.

12. The apparatus of claim 1, wherein at least one of the one or more sensors is a magnetic encoder.

13. The apparatus of claim 1, wherein:
   (a) the one or more sensors comprise a first sensor and a second sensor;
   (b) the first sensor is configured to measure angular displacement of the wheel or of a part operatively coupled to the wheel, relative to a reference; and
   (c) the second sensor is configured to measure angular displacement of the component, relative to the reference.

14. The apparatus of claim 1, wherein the controller is a proportional-derivative controller.

15. The apparatus of claim 1, wherein the flexure is configured to elastically deform during at least a time period in which: (i) the torque contributed to the wheel by the motor exceeds the rider torque; (ii) the elastic deformation of the flexure is changing in magnitude; and (iii) rotational speeds of the wheel and component are equal to each other.

16. Apparatus comprising a radial flexure, one or more sensors and a controller, wherein:
   (a) the radial flexure is part of a drivetrain in a bicycle, which drivetrain includes pedals, the flexure and a component that is directly coupled to the flexure, and which drivetrain is configured to transmit torque from a human rider of the bicycle through at least the pedals, component and radial flexure to a wheel of the bicycle;
   (b) the bike has a frame; a part of the bicycle has a fixed position relative to the frame; the wheel has a first rotational angle relative to the part; and the component has a second rotational angle relative to the part;

(c) the first and second rotational angles may each vary as the wheel and the component, respectively, rotate;
(d) the radial flexure is configured to undergo elastic deformation due to a difference between the first and second rotational angles;
(e) the one or more sensors are configured to measure the elastic deformation; and
(f) the controller is configured to seek to cause the elastic deformation to be equal to a constant, by controlling torque imparted on the wheel by a motor.

17. The apparatus of claim 16, wherein the apparatus further comprises one or more parts of the bicycle, in addition to the flexure, the one or more sensors and the controller.

18. The apparatus of claim 16, wherein the constant is zero.

19. A method comprising, in combination:
(a) using a drivetrain in a bicycle, which drivetrain includes pedals, a radial flexure and a component that is directly coupled to the flexure, to transmit torque from a human rider of the bicycle through at least the pedals, component and flexure to a wheel of the bicycle;
(b) using one or more sensors to measure elastic deformation of the flexure, which elastic deformation is due to a difference between rotational displacement of the wheel and of the component, respectively; and
(c) using a controller to seek to cause the difference to be equal to a constant, by controlling torque contributed to the wheel by a motor.

20. The method of claim 19, wherein:
(a) the flexure is configured to have an axis of rotation; and
(b) the flexure includes spokes that radiate from the axis of rotation.

* * * * *